Nov. 18, 1969   G. HIRS   3,478,879
METHOD AND APPARATUS FOR FILTERING WITH OVERLAPPED FILTER MEDIUM
Filed Aug. 24, 1967   4 Sheets-Sheet 1
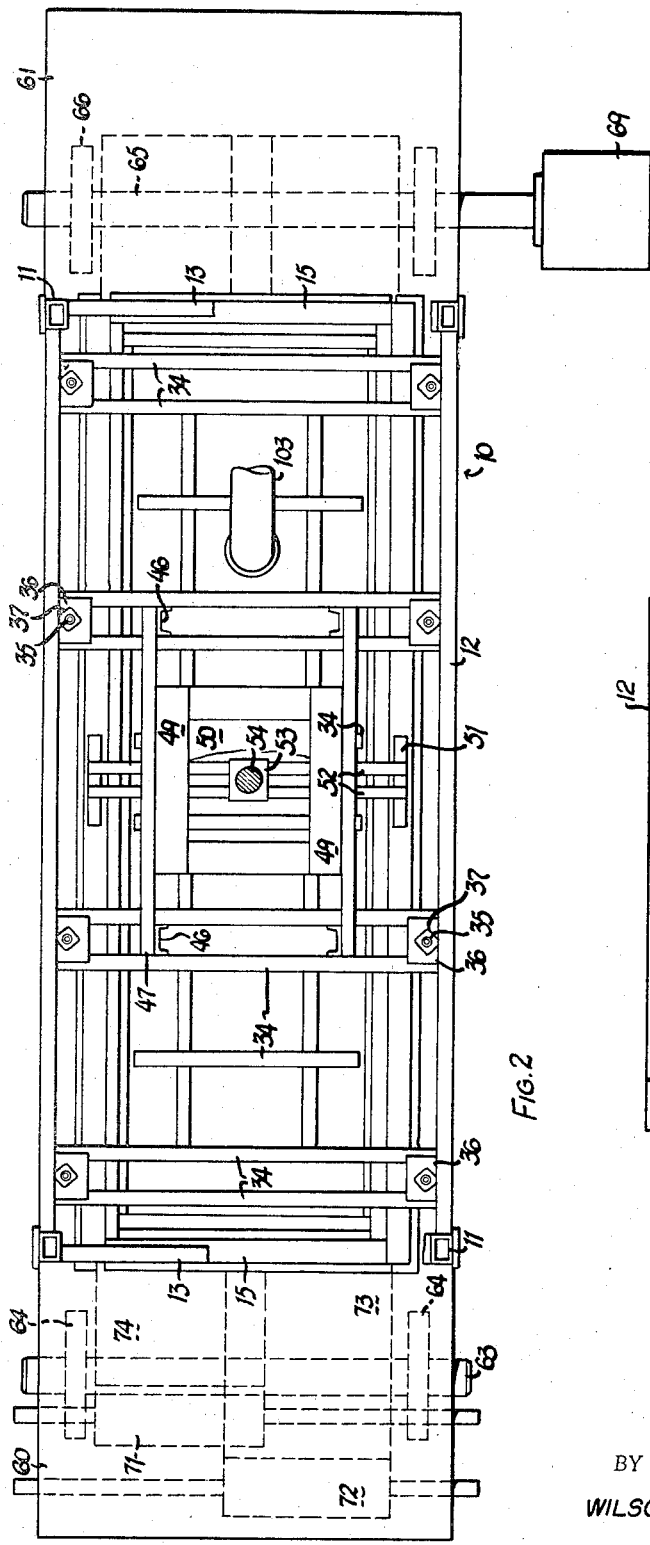
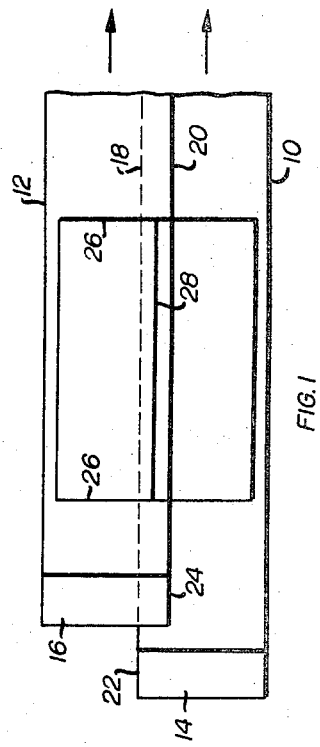
INVENTOR.
GENE HIRS
BY
WILSON, SETTLE & BATCHELDER
ATT'YS.

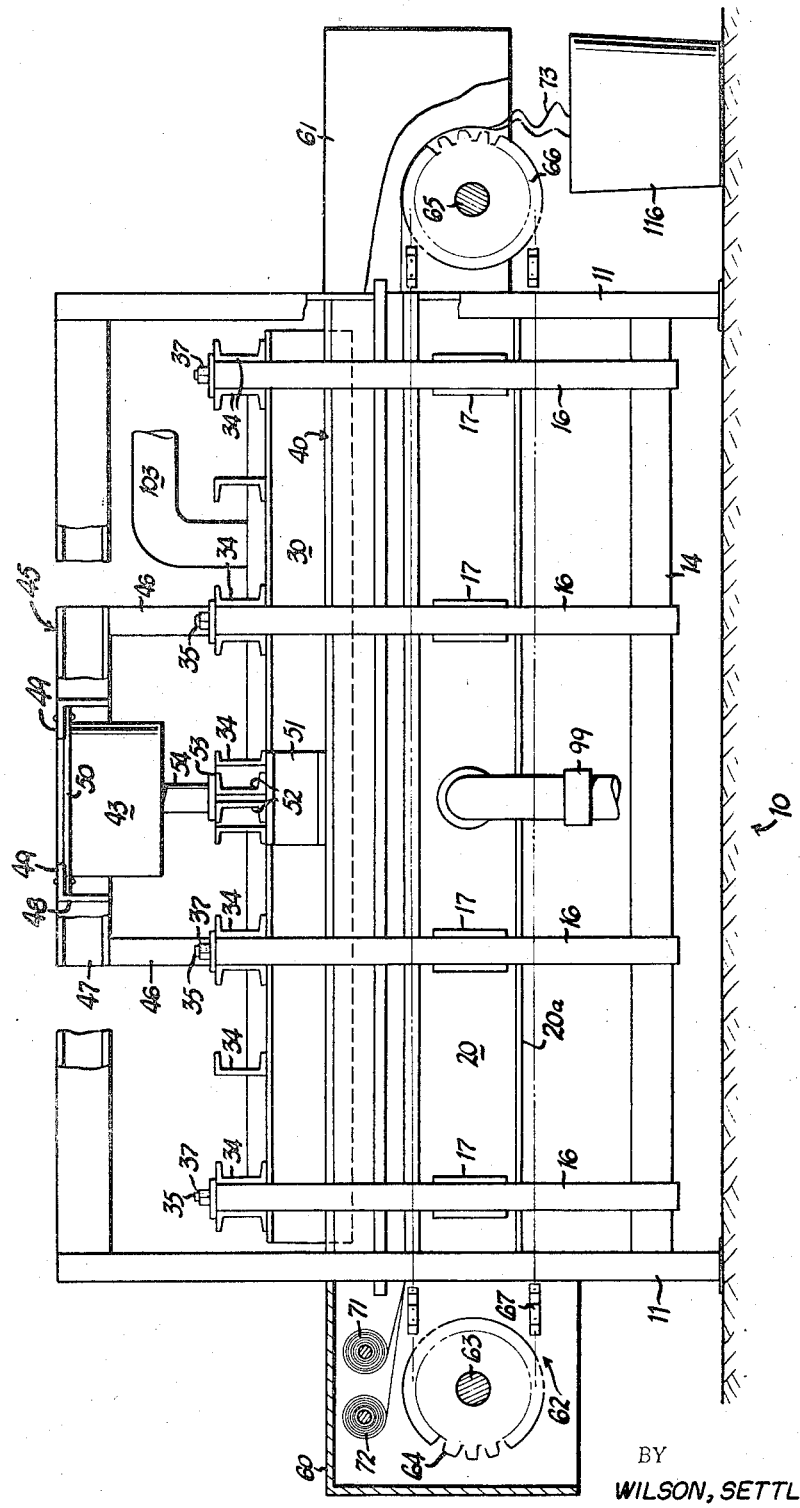

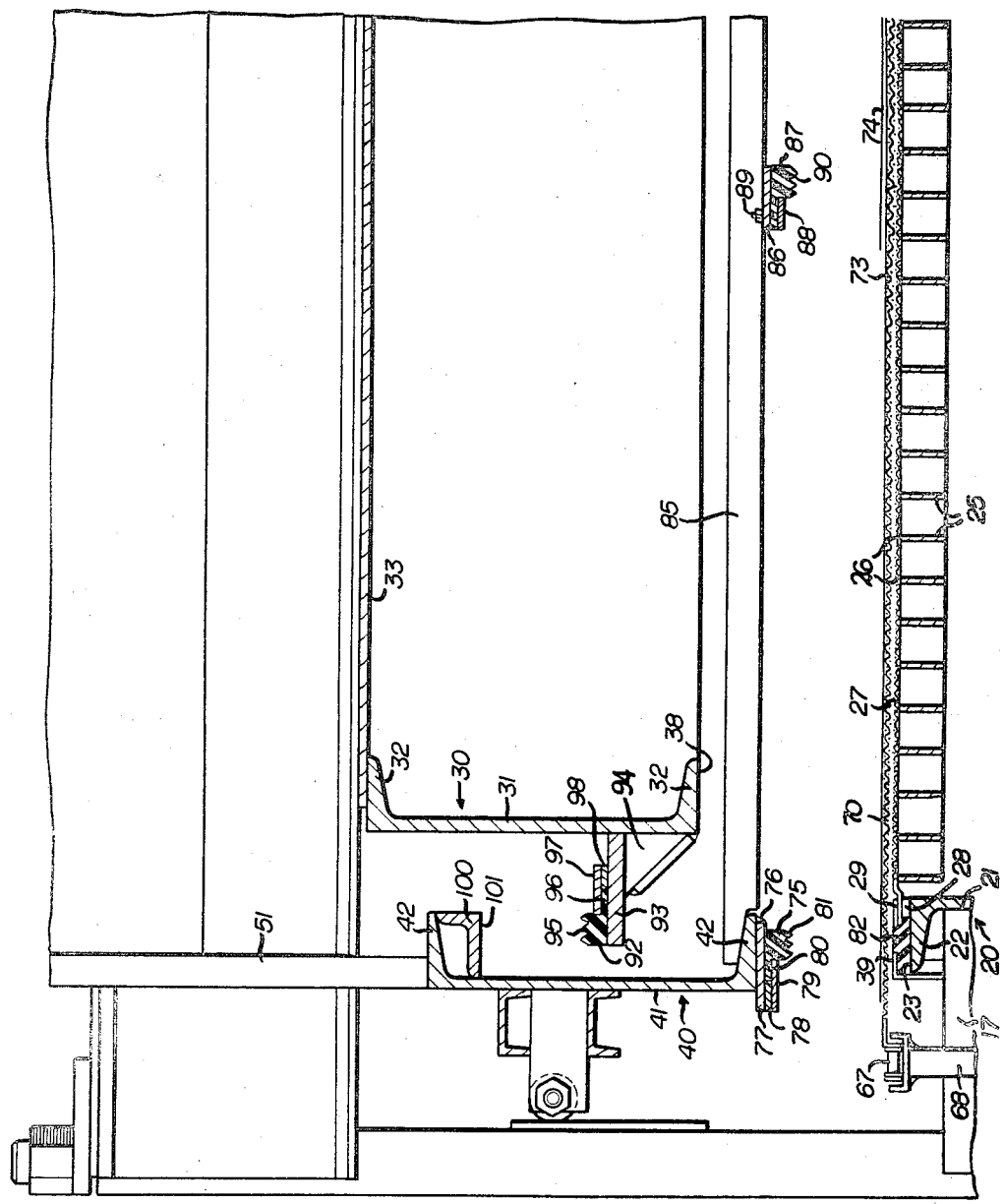

INVENTOR.
GENE HIRS.
BY
WILSON, SETTLE & BATCHELDER
ATT'YS.

United States Patent Office 3,478,879
Patented Nov. 18, 1969

3,478,879
METHOD AND APPARATUS FOR FILTERING WITH OVERLAPPED FILTER MEDIUM
Gene Hirs, 6865 Meadow Lake,
Birmingham, Mich. 48010
Filed Aug. 24, 1967, Ser. No. 662,942
Int. Cl. B01d 29/04
U.S. Cl. 210—77                    13 Claims

ABSTRACT OF THE DISCLOSURE

A filtering apparatus is provided with a filter medium comprised of a plurality of strips of liquid pervious material having overlapping edge portions contacting each other so that the width of the filter medium is greater than the width of any of the individual strips. The filter medium extends through a chamber defining a space for incoming liquid on one side of the filter medium and a space for outgoing liquid on the other side of the filter medium, and the apparatus has a peripheral seal for sealing the filter medium peripherally thereof to the chamber and a further seal or equivalent holding structure for holding the overlapping portions of the filter strips together.

BACKGROUND OF THE INVENTION

Certain types of filters utilize a filter medium in the form of a strip supplied from a roll which can be unwound to feed the filter medium to the filter. Such a filter medium is typically made of paper, and the contaminated paper which comes out of the filter is disposable. Filter paper is commercially available in various widths, and it is obvious that the widest available width imposes a limitation on the maximum area of a given filter.

In order to increase the area of filters, it has been proposed to build filters with several vertically stacked shells and separate filter media between each adjacent pair of shells. Although this can be done, it has been necessary to provide a separate control system for each level of the filter, and, as a practical matter, this is similar to utilizing a plurality of complete filter units to accomplish the filtering. Some simpler way of increasing the area of a filter using a disposable filter medium has been needed.

SUMMARY OF THE INVENTION

In accordance with the present invention, standard sized rolls of a disposable filter medium such as paper may be utilized to provide a composite filter medium of greater width than any of the individual rolls by overlapping the rolls a little so that the edges of the filter strips supplied from the rolls overlap in the filter chamber and the filter strips jointly cover the open area of the chamber. A peripheral seal is provided to seal a peripheral portion of the filter medium to the chamber. In addition, a hold-down structure is provided for holding the overlapping portions of the strip material together, and this structure may also be in the form of a seal which is actuated together with the peripheral seal to engage the filter medium.

The overlapping filter medium may be utilized in various types of filters. For example, the filter may have shells which are relatively movable to clamp the filter medium between them with the sealing and hold-down structures being provided on one of the filter shells to engage the filter medium. For very large filters, it may be more desirable to use the overlapped filter medium in a filter which has fixed shells and a movable seal frame which is movable telescopically relative to one of the filter shells to engage the other filter shell and thereby clamp the filter medium between the seal frame and the other filter shell. In this case, a peripheral seal and a hold-down seal are provided on the seal frame. For some applications it may be desirable to use the overlapped filter medium in a filter with fixed shells and an inflatable seal which accomplishes both the peripheral sealing and the hold-down functions. Examples of all of these types of filters will be described herein, and it is possible that still other types of filters may utilize the overlapped filter medium concept of the invention.

Accordingly, it is an object of this invention to increase the width of a filter medium beyond the widest medium available commercially at the present time.

Another object of the invention is to increase the width of a filter medium by arranging strips of filter material beside each other and in overlapped relation as they pass through the filter.

A further object of the invention is to provide overlapping strips of filter material with a hold-down structure for holding the overlapping portions of the filter material together.

Still another object of the invention is to provide a method of filtering by (1) overlapping filter media of standard widths, and (2) holding the overlapping portions together while operating the filter.

A further object of the invention is to provide a filter medium made from overlapped filter strips with a sealing and hold-down structure which is adaptable to various types of filter apparatus.

Other objects of this invention will appear in the following description and appended claims reference being had to the accompanying drawings forming a part of this specification wherein like reference characters designate corresponding parts in the several views.

On the drawings:

FIGURE 1 is a schematic plan view showing overlapped filter strips and the outline of a peripheral seal and a hold-down seal cooperating with the filter medium;

FIGURE 2 is a plan view of a particular filter apparatus forming one embodiment of the invention employing the overlapped filter medium;

FIGURE 3 is an elevational view of the filter apparatus of FIGURE 2;

FIGURE 4 is a fragmentary sectional view of part of the apparatus of FIGURES 1 and 2;

Figure 5:
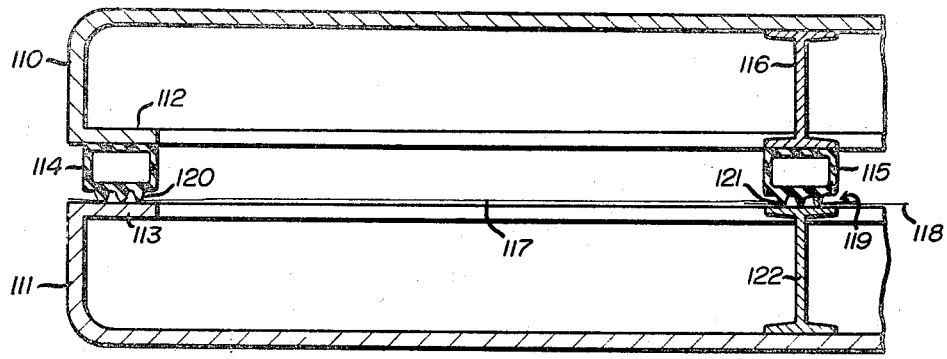
FIGURE 5 is a somewhat schematic sectional view of a filter apparatus employing fixed shells and an expandable seal in accordance with another embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

FIGURE 1 is a schematic view showing the basic nature of the invention. Strips 10 and 12 of liquid pervious material are supplied respectively from rolls 14 and 16 in the direction of the arrows as shown. The strips 10 and 12 are side by side, and it may be seen that the inner edge portions 18 and 20 of the strips overlap each other slightly so that the total width of the filter medium formed by the two strips 10 and 12 is greater than the width of either individual strip. The overlapping of the edge portions 18 and 20 is achieved by arranging the rolls 14 and 16 in staggered relation with their end portions 22 and 24 in overlapping relation. Filter strips 10 and 12 pass through a filter chamber (not shown), and the strips are sealed to the chamber by a peripheral seal designated generally as 26 in FIGURE 1. A linear seal or hold-down structure is represented by the straight line 28 in FIGURE 1, and this linear seal or hold-down structure engages the overlapping edge portions 18 and 20 of the strips and holds them together to prevent leakage of the liquid being filtered between the overlapping strip portions.

At the beginning of a cycle, the seal 26, 28 is in a released condition, and the filter strips 10 and 12 extend through the filter chamber. The seal 26, 28 is then actuated to engage the filter medium formed by strips 10 and 12 both peripherally and along the overlapping portions of the strips. Contaminated liquid is forced through the filter medium under a pressure differential until the filter medium becomes unduly contaminated. The flow of liquid is then terminated, and the seal 26, 28 is released. Strips 10 and 12 are then advanced to move the contaminated portion of the filter medium out from the filter chamber and to automatically feed fresh strip portions from the rolls 14 and 16 to position these fresh portions in the filter chamber. The seal is then engaged with the filter medium again to begin a new cycle.

The method and apparatus of the invention may be applied to different types of filter apparatus, and examples of such different types are illustrated herein. Referring first to FIGURES 1 through 4, there is shown a filter of the type having fixed filter shells and a movable seal frame to which the overlapped medium and peripheral and linear seal are applied.

In FIGURES 1 and 2, reference numeral 10 refers generally to the apparatus as a whole. Apparatus of this type is described and claimed in Patent No. 3,333,693 issued on Aug. 1, 1967, to Gene Hirs, the present inventor. The apparatus will be described generally herein, and reference may be made to the patent for further details of construction.

Apparatus 10 includes a generally rectilinear frame including vertical corner posts 11 in the form of rectangular tubes secured at their upper ends to longitudinal stringers 12 and transverse stringer 13. The posts 11 are also joined adjacent their lower ends by longitudinal stringers 14 and transverse end stringers 15 which are appropriately crossbraced by additional longitudinal and transverse stringers. Secured to the longitudinal stringers 14 are additional upright intermediate posts 16 which are shorter than the corner posts 11 and which are also in the form of rectangular hollow tubes.

Secured to the intermediate posts 16 are a plurality of mounting brackets 17 projecting inwardly therefrom to secure in fixed position a bottom fluid-conducting shell 20. This bottom shell 20 is generally rectangular in overall outline and, as best shown in FIGURE 4, is defined by rectilinearally assembled and secured peripheral channels 21, the flanges 22 of which are outwardly directed so that the upper surfaces 23 thereof define a horizontal shelf or support surface completely circumscribing the shell 20. The top flanges 22 surround the open upper rectangular face of the shell 20, while a closure plate 20a (FIGURE 3) closes the similarly shaped and sized lower face of the shell 20.

The shell 20 is provided with interior support plates 25 (FIGURE 4) providing a plurality of upper longitudinally extending support edges 26. These edges 26 project above the level of the shell flange surfaces 23 to underlie a support screen 27 which has its edges secured to peripheral support blocks 28 mounted on the inner edges of channels 21, the screen being clamped by clamping plates 29 secured by suitable means, as by screws, to the blocks 28. Thus, the lower shell 20 is provided with a water permeable upper surface defined by the screen 27 overlying the edge-plates 25.

Carried by the intermediate posts 16 (FIGURE 3) there is an upper shell indicated generally at 30. The upper shell 30 is completely circumscribed by channels 31 (FIGURE 4) similar to the channels 21, but with the flanges 32 thereof inwardly directed. The upper shell 30 is similar in overall outline to the lower shell 20, but is of substantially less longitudinal and transverse dimension as shown in FIGURE 4.

The upper shell 30 is provided with a fluid impermeable upper surface defined by plate 33 secured to the upper flanges 32 of the channels 31. Secured to this upper plate 33 at longitudinally spaced intervals are transversely extending reinforcing channels 34 (shown in FIGURE 3), adjacent channels being spaced apart and in back-to-back relation to receive the upper ends of the posts 16 therebetween. The posts 16 have threaded studs 35 projecting freely upwardly therefrom, the studs being received through aperture mounting plates 36 which are welded or otherwise rigidly secured to the reinforcing channels 34. Mounting nuts 37 are threaded onto the studs 35 and serve to secure the upper shell 30 to the posts 16.

Thus, it will be seen that the two shells 20 and 30 are carried by the framework elements 11–16 in fixed, spaced apart relation, the lower extremity 38 of the upper shell and the upper extremity 39 of the lower shell both being open. Also, it will be noted that the shells are entirely fluid tight with the exception of their spaced, confronting open sides 38 and 39.

A movable seal frame 40 is provided, this frame being assembled from channels 41 (FIGURE 4) having inturned upper and lower flanges 42. It will be noted that the seal frame 40 is telescopically movable relative to the upper frame 30, the seal frame being shown in its raised position in FIGURE 4. The seal frame 40 thus peripherally encloses the upper frame 30 when it is elevated (FIGURE 4) by means of an actuating cylinder 43 (FIGURE 3). The cylinder 43 is carried by a subframe indicated generally at 45 and comprising upright channels or legs 46 secured to the upper shell channels 34 and joined by longitudinal channels 47. Longitudinal and transverse angle irons 48 having inwardly facing flanges 49 to which an upper support plate 50 is secured, so that the cylinder 43 is suspended to depend downwardly toward the seal frame.

The seal frame itself includes a pair of relatively short mounting channels 51 (FIGURE 3) mounted medially thereon and a pair of back-to-back transverse channels 52 joined by a supporting plate 53 to which is secured the piston rod 54 of the cylinder 43. Extension of the cylinder rod 54 as illustrated in FIGURE 3 will lower the seal frame to its operative position, while upward retraction of the piston rod 54 will elevate the seal frame 40 to its raised position illustrated in FIGURE 4.

Referring to FIGURE 3 of the drawings, it will be seen that each end of the main frame of the machine is provided with an open-bottomed generally rectangular sheet metal enclosure or vestibule. These sheet metal enclosures 60, 61 are secured to the frame in an appropriate manner and serve to support a filter medium conveying structure, indicated generally at 62. More particularly, the inlet vestibule 60 provides an appropriate journal mounting for an idler shaft 63 upon which is mounted an idler sprocket 64. Mounted in outlet vestibule 61 is a drive shaft 65 upon which is mounted a drive sprocket 66. A pair of such sprockets 64–66 is provided in each vestibule, the transverse spacing between the sprockets of each pair being somewhat greater than the transverse width of the lower shell 20. Looped around each pair of the sprockets 64, 66 is an endless chain 67, two chains thus being provided, one on each side of the lower shell 20.

As illustrated in FIGURE 4, these chains are supported by the upper surface of guide channels 68 for longitudinal displacement, the guide channels 68 being carried by the lower shell mounting brackets 17 and bridging the longitudinal gaps therebetween. Also it will be noted that the chains run between the vertical support posts 16 and outside the confines of both the filter shells 20, 30 and outside the seal frame 40.

The chains 67 are each secured to and serve to convey longitudinally an endless screen 70. The upper horizontal reach of this screen 70 overlies the lower shell 20 and is supported upon the edges 26 of the support plates 25 heretofore described and as shown in FIGURE 4. Upon actuation of the drive sprocket 66, as by the drive motor 69 (FIGURE 1), the screen 70 is advanced longitudinally between the shells 20 and 30.

The inlet vestibule 60 encloses two supply rolls 71 and 72 of disposable, liquid permeable strip material, such as paper or the like, the strips 73 and 74 supplied from these rolls overlapping each other at their inner edges and being superimposed upon the screen 70 for travel therewith through space intemediate the shells 20 and 30. The paper strips travel horizontally with the upper reach of the screen 70 and depart therefrom only after the screen is deflected into its lower return pass as it travels about the drive sprocket 66. It may be noted that the rolls 71 and 72 are in staggered overlapping relationship in the manner described in connection with FIGURE 1, so that the strips 73 and 74 will automatically overlap as they are fed into and through the shells 20 and 30. In this manner, the strips 73 and 74 form an overall composite filter medium which is wider than the individual strips.

As thus shown in FIGURE 4, the seal frame 40 carries a sealing element indicated generally at 75. Sealing element 75 is made of an elastomeric material, such as rubber, neoprene or the like, and is secured to the peripheral seal frame channel 41. An attachment plate 77 is secured to the undersurface 76 of the channel flange 42 by suitable means, as by welding, and a block 78 is secured to the plate 77 as by welding. An elongated plate 79 is secured to block 78 and clamps a portion 80 of the sealing element 75 to the attachment plate 77. The sealing element 75 extends all the way around the lower end of the seal frame 40 and is provided with a serrated surface 81 for contacting the filter medium formed by the strips 73 and 74 as they are supported on the conveyor screen 70.

Underlying screen 70 and paper 73 and secured to the top surface 23 of lower shell channel 21 is another sealing element 82 which also may be made of rubber or other elastomeric material. The sealing element 82 extends all the way around the lower shell 20 and is in registry with the serrated surface 81 of the upper sealing element 75. Thus, when the seal frame 40 is lowered, serrated surface 81 of sealing element 75 presses the filter paper 73 and screen 70 against the top surface of the registering sealing element 82 to provide a liquid-tight peripheral seal for sealing the filter medium to the lower shell 20.

Secured to the lower flange 42 of seal frame channel 41 are a number of transversely extending beams 85 which extend all the way across the seal frame 40, one of these beams 85 being shown clearly in FIGURE 4. An elongated plate 86 is secured to these beams as by welding and bridges the gaps therebetween such that the elongated plate 86 extends longitudinally across the full length of the seal frame. A further sealing element 87, made of rubber or the like, is clamped to plate 86 by a clamping member 88 which may be secured to plate 86 as by bolt 89. The longitudinal sealing element 87 is in registry with the overlapping portions of the two filter strips 73 and 74 as shown in FIGURE 4. Thus, when the seal frame 40 is lowered, the serrated surface 90 of longitudinal sealing element 87 presses the overlapping portions of filter strips 73 and 74 together and against screen 70, screen 27 and at least one of the edge-set plates 25 to provide a liquid-tight seal at the overlapping filter strip portions to prevent liquid from flowing between these overlapping portions. Thus, the filter medium has both a peripheral seal provided by sealing elements 75 and 82, and also an overlap seal provided by the longitudinal sealing element 87.

In order to seal the seal frame 40 to the upper shell 30, an additional sealing element 92 is provided, this latter sealing element being mounted on a ledge 93 secured as by welding to the upper shell channel 31 and braced by a strut 94. Sealing element 92 has a serrated upper surface 95 and a leg 96 which is clamped against ledge 93 by an overlying plate 97. Plate 97 is in turn secured to a member 98 which is secured as by welding to the ledge 93. Serrated surface 95 of sealing element 92 is in registry with a horizontal surface of a channel 100 which is secured as by welding to the seal frame channel 41 as shown in FIGURE 4. When the seal frame 40 is lowered, the horizontal surface 101 of channel 100 is lowered into contact with the serrated surface 95 of sealing member 92 to provide a liquid-tight seal between the seal frame and the upper shell. Although the latter seal depends upon movement of the seal frame, it will be understood that a permanent seal could be provided between the seal frame 40 and the upper shell 30 by means, for example, of a flexible strip attached to channels 41 and 31 in the manner described in Patent No. 3,333,693 referred to previously.

In the operation of the apparatus described thus far, the overlapping filter strips 73 and 74 are fed to the space between the shells 20 and 30 and extend through the chamber formed by the shells with the shells being in their open position. The inner edges of the filter strips 73 and 74 are overlapped a little as has been described to form a composite filter medium from the strips having an overall width greater than the width of either of the individual strips. The composite filter medium is then sealed to the shells by lowering the seal frame 40 to engage the sealing elements 75 and 92 respectively with the sealing element 82 and the channel 100. The overlapping portions of the strips 73 and 74 are held together by engagement of the sealing element 87 with the overlapping portions of filter strips 73 and 74, the screens 70 and 27, and the underlying edge-set plates 25.

The next step is to flow liquid under a pressure differential from the upper shell through the filter medium to the lower shell, and this is accomplished by introducing liquid through an inlet 103 leading into the upper shell 30, and withdrawing liquid from an outlet 99 leading out of the lower shell 20 (FIGURES 2 and 3). After the filter medium has reached a predetermined degree of contamination as measured, for example, by a pressure sensor in one of the shells, or alternatively after a predetermined period of time as measured by a timer, the flow of liquid through the filter medium is terminated. The seal frame 40 is then moved upward to release the filter medium, and the conveyor chains 67 are actuated to advance the contaminated filter medium from the chamber and simultaneously feed fresh filter medium material into the chamber from the rolls 71 and 72. The apparatus is then ready to begin another cycle.

Figure 6:
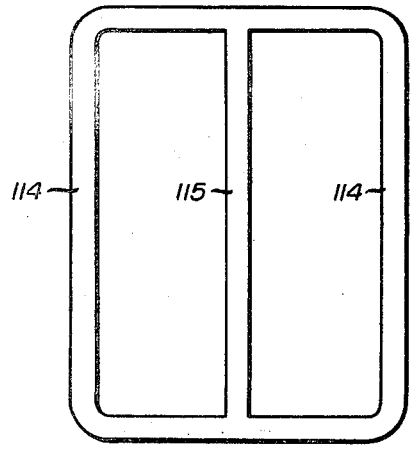
FIGURE 6 is a schematic plan view of the sealing structure of the apparatus of FIGURE 5.

Although the invention as described so far has been applied to a filter apparatus using fixed shells and a movable seal frame, the invention is also applicable to other types of filters as illustrated by FIGURES 5 through 9. Referring first to FIGURES 5 through 8, there is shown an apparatus including two fixed shells 110 and 111 having inwardly turned flanges 112 and 113 providing registering horizontal ledge surfaces extending all the way around the periphery of the two shells. Attached to the ledge 112 of the upper shell 110 is an inflatable sealing element 114, a plan view of which is shown in FIGURE 6. It may be noted in FIGURE 6 that the sealing element 114 has a central leg 115, and as shown in FIGURE 5, the central leg 115 is secured to a beam 116 which in turn is secured to the upper shell 110 as by welding.

Between the shells there is provided a pair of filter strips 117 and 118 which have overlapping portions at 119 in alignment with the central leg 115 of the seal 114. The seal 114 with central leg 115 is an inflated condition such that the serrated surfaces 120 and 121 of the peripheral sealing element 114 and the central leg 115 are in engagement with the filter medium and press the filter medium respectively against ledge 113 of lower shell 111 and other I-beam 112 attached to the lower shell 111. Thus, the filter medium formed by strips 117 and 118 is peripherally sealed to the lower shell and is also sealed at the overlapping portions of filter strips 117 and 118 to hold those overlapping portions together.

Figures 7, 8:
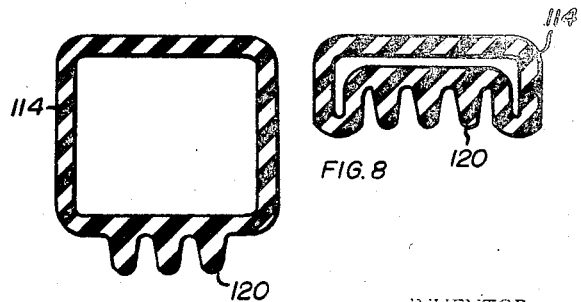
FIGURE 7 is a cross sectional view of a portion of the expandable seal of FIGURE 6 in an inflated condition.
FIGURE 8 is a cross sectional view similar to FIGURE 7 but showing the inflatable seal in a deflated condition.

In order to release the filter medium, the inflatable sealing element 114, 115 is simply deflated, and when this occurs, the sealing element folds back within itself in the manner illustrated in FIGURE 8. It may be seen that the serrated surface 120 has been withdrawn back into the side walls of the sealing element such that there is a clearance between the sealing element and the filter medium. The filter medium may then be advanced out from between the shells and replaced by fresh filter material to permit the filtering operation to continue. It will be apparent that the method of the invention as applied to the apparatus of FIGURES 5 through 8 is exactly the same as has been described previously except that rather than moving a seal frame to accomplish sealing and releasing of the seal, the sealing element 114, 115 is merely inflated and deflated to accomplish sealing and releasing of the filter medium.

Figure 9:
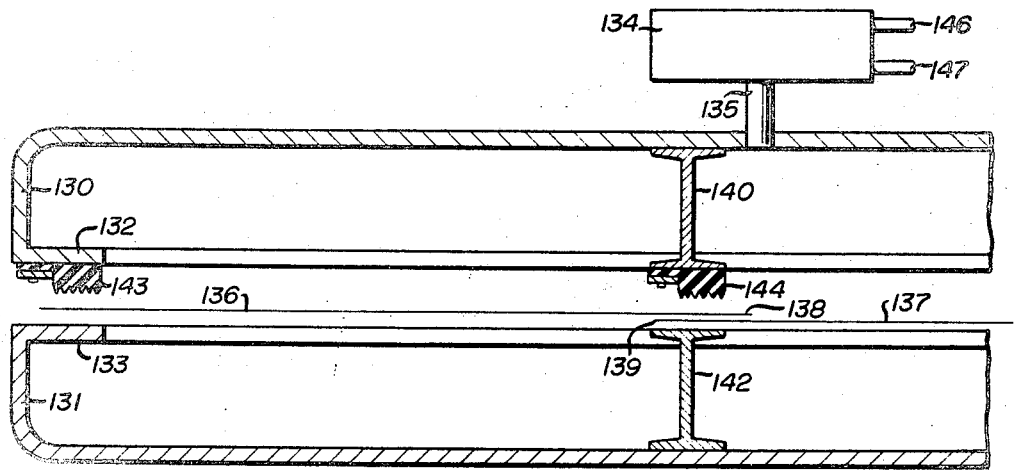
FIGURE 9 is a fragmentary cross sectional view of a filter apparatus employing relatively movable shells with a sealing and hold-down structure for overlapping filter strips in accordance with another embodiment of the invention.

FIGURE 9 shows schematically another type of filter apparatus to which the invention may be applied. The apparatus includes an upper shell 130 and a lower shell 131 respectively having inturned flanges 132 and 133 so that the shells have open sides in confronting relation with each other. In this apparatus, the upper shell 130 is movable by actuation of a cylinder 134 and piston 135 to close and open the filter. Two filter strips 136 and 137 are arranged in side-by-side relationship with their inner edge portions 138 and 139 overlapping each other to provide a composite filter medium which is wider than the width of either of the strips, and I-beam 140 is attached to the upper shell 130 and another I-beam 142 is attached to the lower shell 131, the latter I-beams being aligned with the overlapping portions 138 and 139 of the filter medium. A peripheral sealing element 143 is attached to the flange 132 of upper shell 130, and this sealing element 143 is in alignment with the flange 133 of the lower shell 131. The sealing element 143 extends around the entire periphery of upper shell 130 so that when the shell 130 is lowered to close the filter, sealing element 143 engages the filter medium peripherally and presses it against flange 133 to provide a liquid-tight seal. Another sealing element 144 is attached to I-beam 140 in registry with the overlapping portions 138 and 139 of the filter medium. When the shell 130 is lowered, sealing element 144 provides a longitudinal seal to hold the overlapping portions 138 and 139 together by pressing those portions against the top of I-beam 142. The upper shell 130 is lowered by forcing fluid into the cylinder 134 through conduit 146 and exhausting fluid through conduit 147. Conversely, the upper shell 130 is raised by forcing fluid under pressure to conduit 147 and exhausting fluid through conduit 146.

It will be seen that the method of the invention as applied to the apparatus of FIGURE 9 is exactly the same as previously described except that the upper shell 130 is lowered to seal the filter medium to the lower shell and to hold the overlapping portions of the filter medium together, and the upper shell 130 is raised to release the filter medium so that it can be advanced to bring fresh filter medium material into position between the shells.

Having thus described my invention I claim:

1. In a filter apparatus having an upper shell and a lower shell in confronting relation, with each of said shells having an open side facing the other shell, and with a filter medium between said shells, means for introducing liquid into said upper shell for flow through said filter medium into said lower shell and means for removing liquid from said lower shell, the improvement comprising a filter medium extending between said shells comprised of first and second strips of liquid pervious material overlapping each other centrally of the open sides of said shells and arranged to jointly cover the open sides of said shells, and means for sealing said first and second strips to said shells including a peripheral sealing means for engaging said strips peripherally of the composite filter medium formed thereby, and an overlap sealing means registering with the overlapping portions of said strips and engageable therewith to hold said overlapping portions together, said overlap sealing means comprising an elongated sealing member spanning said shells and aligned with said overlapping portions of said filter medium, at least a portion of said sealing member being movable into and out of engagement with said overlapping portions.

2. The filter apparatus as claimed in claim 1 in which said first and second filter medium strips are supplied from separate strip sources arranged in staggered overlapping relation to overlap the first and second strips and to afford feeding of fresh strip material to the shells upon advancement of contaminated strip material out from between said shells.

3. The filter apparatus as claimed in claim 1 in which said shells are relatively movable to engage each other with said filter medium clamped therebetween, and said peripheral and overlap sealing means are carried by one of said shells to engage sealing surfaces on the other of said shells upon closing of said shells.

4. The filter apparatus as claimed in claim 1 in which said first and second shells are fixed, said peripheral and overlap sealing means are carried by one of said shells and are engageable with the other of said shells, and said peripheral and overlap seals are inflatable to effect sealing of said filter medium and are deflatable to release said filter medium.

5. The filter apparatus as claimed in claim 1 in which said first and second shells are fixed and said apparatus includes a seal frame telescopically movable relative to one of said shells and engageable with the other of said shells to effect sealing of said filter medium, said peripheral sealing means and said overlap sealing means being carried by said seal frame in position to engage said filter medium upon closing of said seal frame and said other shell.

6. In a filter apparatus having first and second shells in confronting relation with each other, with each of said shells having an open side facing the other shell, and with a filter medium between said shells, means for introducing fluid into one of said shells for flow through said filter medium into the other of said shells, and means for removing liquid from said latter other shell, the improvement comprising a filter medium extending between said shells comprised of a plurality of strips of liquid pervious material overlapping each other within the limits of the open sides of said shells and jointly covering the open sides of said shells, the overall lateral width of said filter medium being greater than the width of the individual strips, an annular peripheral sealing means for engaging said strips peripherally of the composite filter medium formed thereby, and hold-down means engageable with the overlapping portions of said strips to hold said overlapping portions together, said hold-down means comprising an elongated sealing member spanning said shells and aligned with said overlapping portions of said filter medium, at least a portion of said sealing member being movable into and out of engagement with said overlapping portions.

7. A filter apparatus including in combination a filter medium comprised of a plurality of strips of liquid pervious material having overlapping edge portions contacting each other so that the width of said filter medium is greater than the width of any of the individual strips, chamber means defining a space on one side of said filter medium for incoming liquid and a space on the other side of said filter medium for outgoing liquid, the liquid flowing in the operation of said apparatus from the incoming space through said filter medium to the outgoing space, an annular means for sealing said filter medium peripherally thereof to said chamber means, and means for holding said overlapping portions of said filter strips together, said holding means comprising an elongated linear sealing structure spanning said shells and said annular means and aligned with said overlapping portions of said filter medium, at least a portion of said sealing structure being movable into and out of engagement with said overlapping portions to hold the same together along a line of engagement.

8. In a method of filtering contaminated liquid utilizing a filter chamber and a filter medium extending through said chamber for flow of liquid from one space on one side of said filter medium through said filter medium to another space on the other side of said filter medium, the steps of feeding a plurality of strips of liquid pervious filter material to said chamber, overlapping edge portions of said strips in said chamber to form a composite filter medium from said strips having an overall width greater than the width of any of the individual strips, sealing said composite filter medium to said chamber with an annular sealing member peripherally engaging said filter medium, holding the overlapping portions of said strips together with a hold-down means which comprises an elongated sealing member aligned with and engaging said overlapping portions and spanning said annular sealing member, flowing liquid under a pressure differential from said one space through said filter medium to said other space to deposit contaminants from said liquid on to said filter medium, terminating said liquid flow, releasing said filter medium including disengaging said sealing members from said overlapping portions, advancing the contaminated strip material from said chamber and feeding fresh strip material into said chamber to begin another filtering cycle.

9. The method of filtering as claimed in claim 8 in which said filter strips are respectively supplied from individual sources so that as said contaminated filter strip portions are advanced from said chamber the fresh filter strip portions are automatically fed into said chamber.

10. The method of filtering as claimed in claim 9 in which said sources of strips are arranged in staggered overlapping relation with each other so that the filter strips supplied from said sources automatically overlap each other in said filter chamber.

11. The method of filtering as claimed in claim 8 in which said filter chamber is formed by first and second shells at least one of which is movable, and said sealing and holding steps are carried out by relatively moving said shells together to engage said filter medium with a peripheral seal and an overlap seal provided on one of said shells.

12. The method of filtering as claimed in claim 8 in which said filter chamber is formed by first and second fixed filter shells, and in which said sealing and holding steps are carried out by inflating an inflatable sealing means carried by one of said shells to engage said filter medium peripherally and also along said overlapping portions of said filter strips, said inflatable sealing means having a peripheral portion and also a portion in registry with said overlapping portions of said filter strips.

13. The method of filtering as claimed in claim 8 in which said filter chamber is formed by first and second fixed filter shells and a movable seal frame, and in which said sealing and hold steps are carried out by moving said seal frame to engage said filter medium peripherally and along said overlapping portions of said strips with a peripheral seal and an overlap seal on said seal frame.

References Cited
UNITED STATES PATENTS

| 2,867,324 | 1/1959 | Hirs | 210—138 X |
| 2,867,326 | 1/1959 | Hirs | 210—138 X |
| 3,333,693 | 8/1967 | Hirs | 210—387 X |

SAMIH N. ZAHARNA, Primary Examiner

U.S. Cl. X.R.

210—387